United States Patent
Cheng

(10) Patent No.: US 6,769,503 B2
(45) Date of Patent: Aug. 3, 2004

(54) BATTERY COMPARTMENT FOR A MOTORIZED WHEEL CHAIR

(75) Inventor: Ming-Chuan Cheng, Taichung (TW)

(73) Assignee: Merits Health Products Co., Ltd. (TW)

(*) Notice: Subject to any disclaimer, the term of this patent is extended or adjusted under 35 U.S.C. 154(b) by 13 days.

(21) Appl. No.: 10/162,919

(22) Filed: Jun. 6, 2002

(65) Prior Publication Data

US 2003/0226699 A1 Dec. 11, 2003

(30) Foreign Application Priority Data

May 23, 2001 (TW) .................... 90208394 U

(51) Int. Cl.[7] ............................................. B60R 16/04
(52) U.S. Cl. .................. 180/68.5; 180/65.1; 180/907; 280/304.1; 280/650
(58) Field of Search ................. 180/68.5, 65.1, 180/907; 280/250.1, 304.1, 639, 642, 647, 650, 649, 47.38, 42

(56) References Cited

U.S. PATENT DOCUMENTS

| | | | | |
|---|---|---|---|---|
| 4,140,192 A | * | 2/1979 | Sharpe | 180/6.5 |
| 4,960,287 A | * | 10/1990 | Lautzenhiser et al. | 280/304.1 |
| 4,967,864 A | * | 11/1990 | Boyer et al. | 180/65.1 |
| 5,135,063 A | * | 8/1992 | Kropf | 180/13 |
| 5,156,226 A | * | 10/1992 | Boyer et al. | 180/65.1 |
| 5,197,559 A | * | 3/1993 | Garin et al. | 180/65.1 |
| 5,351,774 A | * | 10/1994 | Okamoto | 180/65.1 |
| 5,522,734 A | * | 6/1996 | Goertzen | 439/500 |
| 5,531,284 A | * | 7/1996 | Okamoto | 180/65.1 |
| 6,095,271 A | * | 8/2000 | Dickie et al. | 180/68.5 |
| 6,145,612 A | * | 11/2000 | Dickie | 180/65.5 |
| 6,481,514 B2 | * | 11/2002 | Takada | 180/11 |

* cited by examiner

Primary Examiner—Brian L. Johnson
Assistant Examiner—Jeffrey J Restifo
(74) Attorney, Agent, or Firm—Bacon & Thomas, PLLC

(57) ABSTRACT

A battery compartment for a motorized wheel chair includes a first securing bracket adapted to be securely connected to a side bracket of the motorized wheel chair, and a second securing bracket adapted to be securely connected to the side bracket of the motorized wheel chair and being opposite to the first securing bracket. A U-shaped first frame is pivotally connected to the first securing bracket. A U-shaped second frame is pivotally connected to the second securing bracket and to the first frame.

7 Claims, 6 Drawing Sheets

BATTERY COMPARTMENT FOR A MOTORIZED WHEEL CHAIR

BACKGROUND OF THE INVENTION

1. Field of the Invention

The present invention relates to a battery compartment, and more particularly to a battery compartment for a motorized wheel chair. The battery compartment has two halves each pivotally connected with one another and having a stop formed on a side thereof so as to prevent excess pivotal movement of the other.

2. Description of Related Art

With reference to FIG. 4, a conventional motorized wheel chair (60) is shown. The motorized wheel chair (60) has two brackets (61) mounted on opposite sides of the motorized wheel chair (60). The two brackets (61) are connected with connection rods (62) in such a manner that the motorized wheel chair (60) is able to be folded. A battery compartment (63) is formed between two rear wheels (64) so as to receive therein batteries. The batteries are able to provide electricity to power the motor in the motorized wheel chair (60). When the motorized wheel chair (60) is not in use and to be folded, the batteries must be removed and stored elsewhere.

Nowadays, there are different ways of receiving the batteries in the motorized wheel chair. With reference to FIG. 5, a conventional method for receiving batteries is shown. The bracket (71) of the motorized wheel chair (70) has two fixing rods (72) extending oppositely from an inner side of the bracket (71) of the motorized wheel chair (70) toward the battery compartment (700). A support (73) is provided on distal ends of the two fixing rods (72) to support the battery (74). A reinforced plate (75) is provided to connect two supports (73) so as to reinforce the strength of the supports (73) when having the batteries (74) thereon.

When the motorized wheel chair (70) is not in use, the bolt (76) has to be removed to disassemble the connection between the reinforced plate (75) and the supports (73) so that the batteries (74) are able to be removed for storage and the motorized wheel chair (70) is able to be folded as shown in FIG. 6.

This kind of motorized wheel chair (70) requires constant removal of the batteries (74) from the bracket (71) especially when the motorized wheel chair (70) is to be folded, such that not only the assembly and disassembly of the reinforced plate (75) are time consuming, but also the mounting and dismounting of the batteries (74) are labor intensive and therefore exhaustive. This may prove to be troublesome and expensive as the wheel chair user will rely on another person, probably a professional carer, whose time will be used excessively in this operation.

A further disadvantage of the motorized wheel chair is that the parts for securing the overall integrity are easily lost especially when disassembly of the motorized wheel chair is a constant routine.

To overcome the shortcomings, the present invention intends to provide an improved battery compartment to mitigate or obviate the aforementioned problems.

SUMMARY OF THE INVENTION

The primary objective of the invention is to provide an improved battery compartment having two halves. Each half is securely connected to an inner side of the bracket of the motorized wheel chair so that the two halves encounter each other to form a support for holding a battery thereon.

Another objective of the invention is to provide a stop on a side of each of the halves so that excess pivotal movement of the two halves is prevented when each of the halves engages with the stop.

Other objects, advantages and novel features of the invention will become more apparent from the following detailed description when taken in conjunction with the accompanying drawings.

DETAILED DESCRIPTION OF PREFERRED EMBODIMENT

Figure 1:
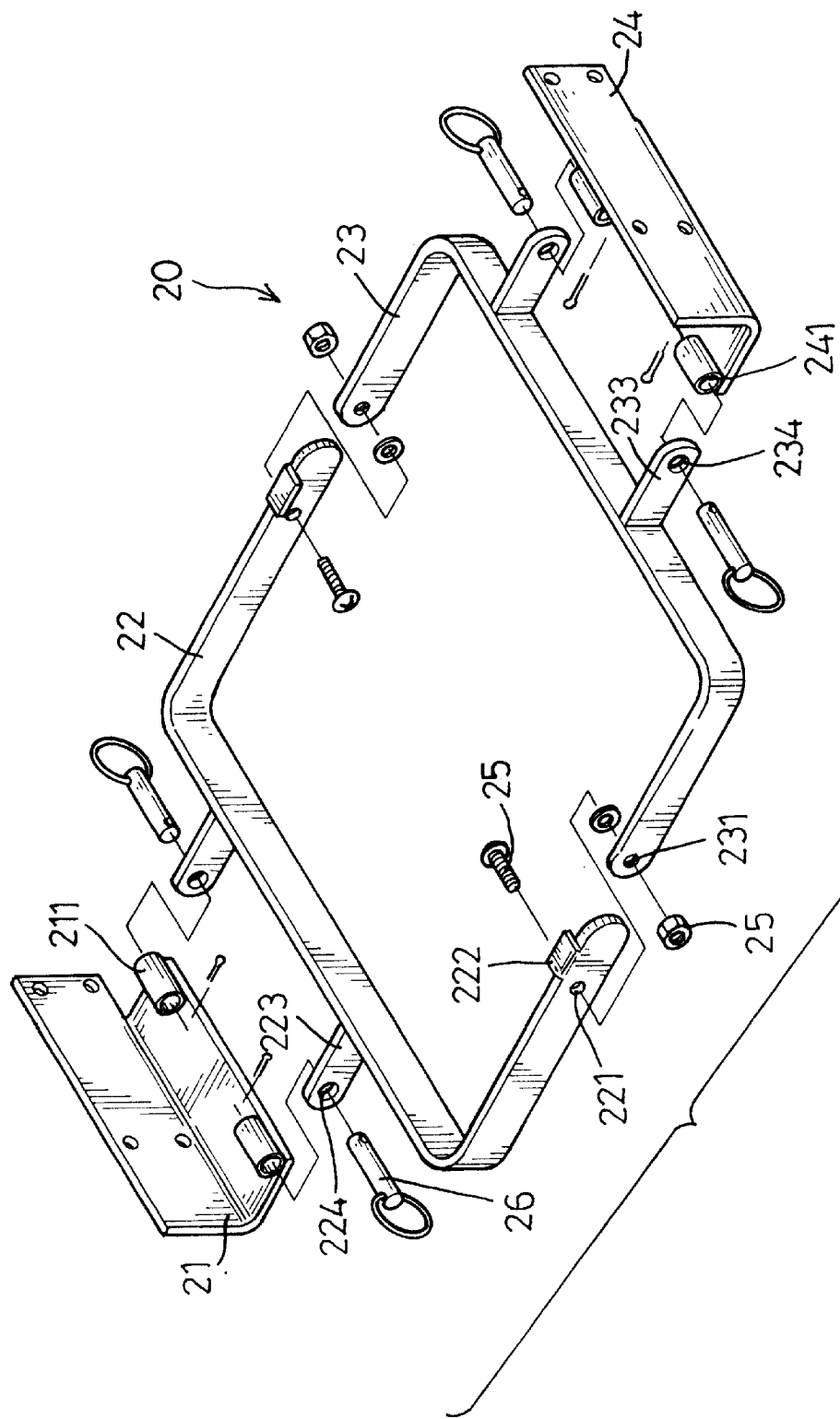
FIG. 1 is an exploded perspective view of the battery compartment of the present invention.

With reference to FIG. 1, the battery compartment (20) has a first securing bracket (21), a first frame (22), a second frame (23) and a second securing bracket (24).

The first securing bracket (21) is L shaped and has a pair of sleeves (211) firmly formed on a horizontal plate of the first securing bracket (21). Because the second securing bracket (24) has the same structure as that of the first securing bracket (21), the description to the second securing bracket (24) is omitted but will be incorporated hereinafter.

The first frame (22) is substantially U shaped and has a hole (221) defined in both distal ends of the first frame (22), a stop (222) formed on a side face adjacent to each of the distal ends of the first frame (22) and extending toward each other, and two first extensions (223) formed on an outer face at a bottom of the first frame (22) and respectively having a through hole (224) defined to correspond to one of the sleeves (211) of the first securing bracket (21).

The second frame (23) is also substantially U shaped and reversed to the first frame (22). The second frame (23) has two apertures (231) respectively defined at a distal end thereof to correspond to the through hole (221) of the first frame (22) and two second extensions (233) formed on an outer face at a bottom of the second frame (23) and respectively having a through hole (234) defined to correspond to one of two sleeves (241) of the second securing bracket (24).

Figure 2:
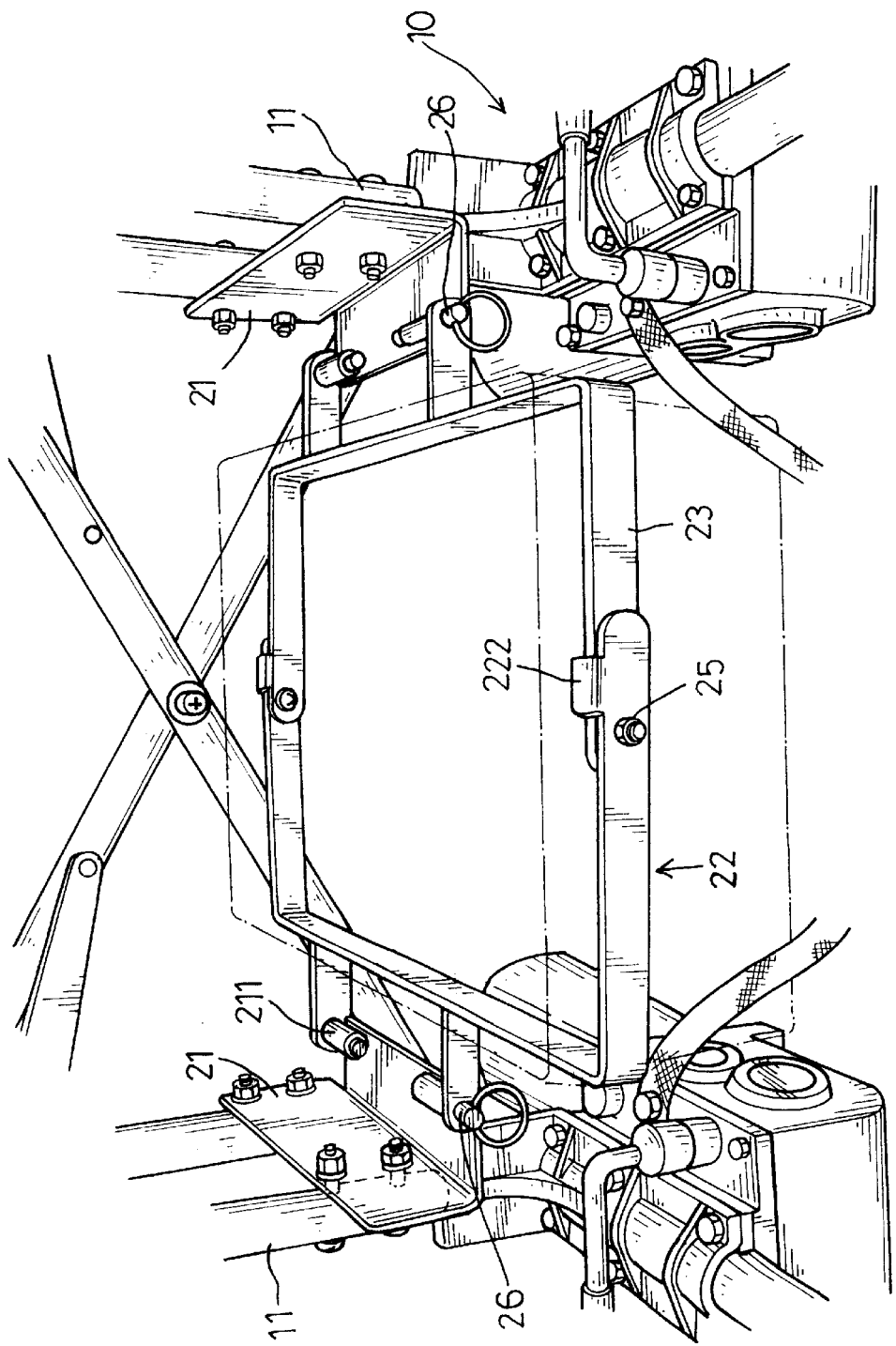
FIG. 2 is a partial perspective view showing that the assembled battery compartment is adapted to be connected to the bracket of the motorized wheel chair.

With reference to FIG. 2 and still taking FIG. 1 into consideration, when the battery compartment of the present invention is to be assembled, the first and second securing brackets (21,24) are adapted to be securely connected to two side brackets (11) of the motorized wheel chair (10). After the assembly of the first and second securing brackets (21,24), the first and second frames (22,23) are respectively and pivotally connected to the sleeves (211,241) of the first and second securing brackets (21,24). That is, the two through holes (224,234) of the two extensions (223,233) of the first and second frame (22,23) are aligned with the sleeves (211,241) and then a securing bolt (26) is inserted into the aligned through holes (224,234) and the sleeves (211,241) to secure the pivotal engagement of the extensions (223,233) to the sleeves (211,241). Thereafter, the first and the second frames (22,23) are pivotable relative to the first securing bracket (21) and the second securing bracket (24) respectively.

Then, the through holes (221) of the first frame (22) align with the apertures (231) of the second frame (23) such that a bolt and nut combination (25) is able to secure the pivotal engagement between distal ends of the first and second frames (22,23). After the battery compartment (20) of the present invention is assembled, it is to be noted that the stops (222) formed on the distal ends of the first frame (23) are able to prevent excessive pivotal movement between the first and second frames (22,23) when the battery compartment (20) is extended.

Figure 3:
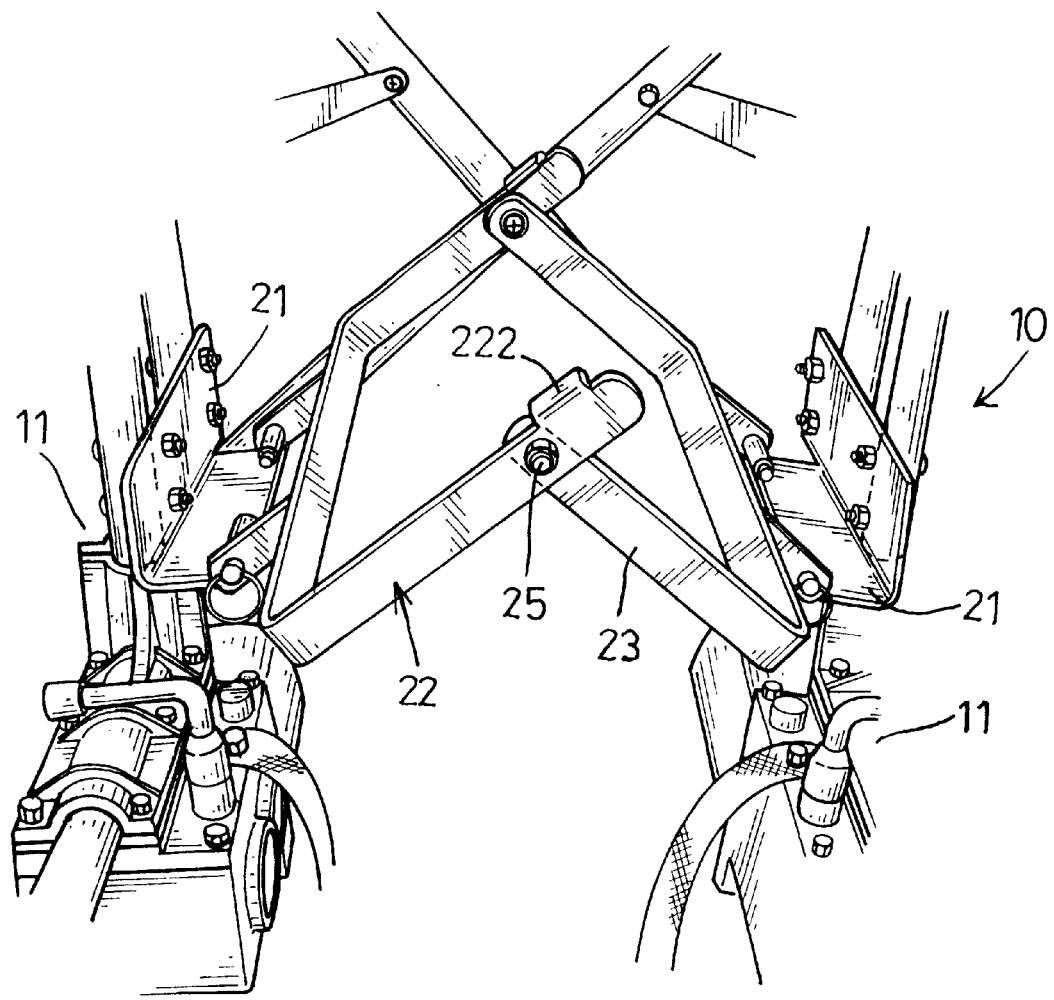
FIG. 3 is a partial perspective view showing the folding of the battery compartment of the present invention.
Figure 4:
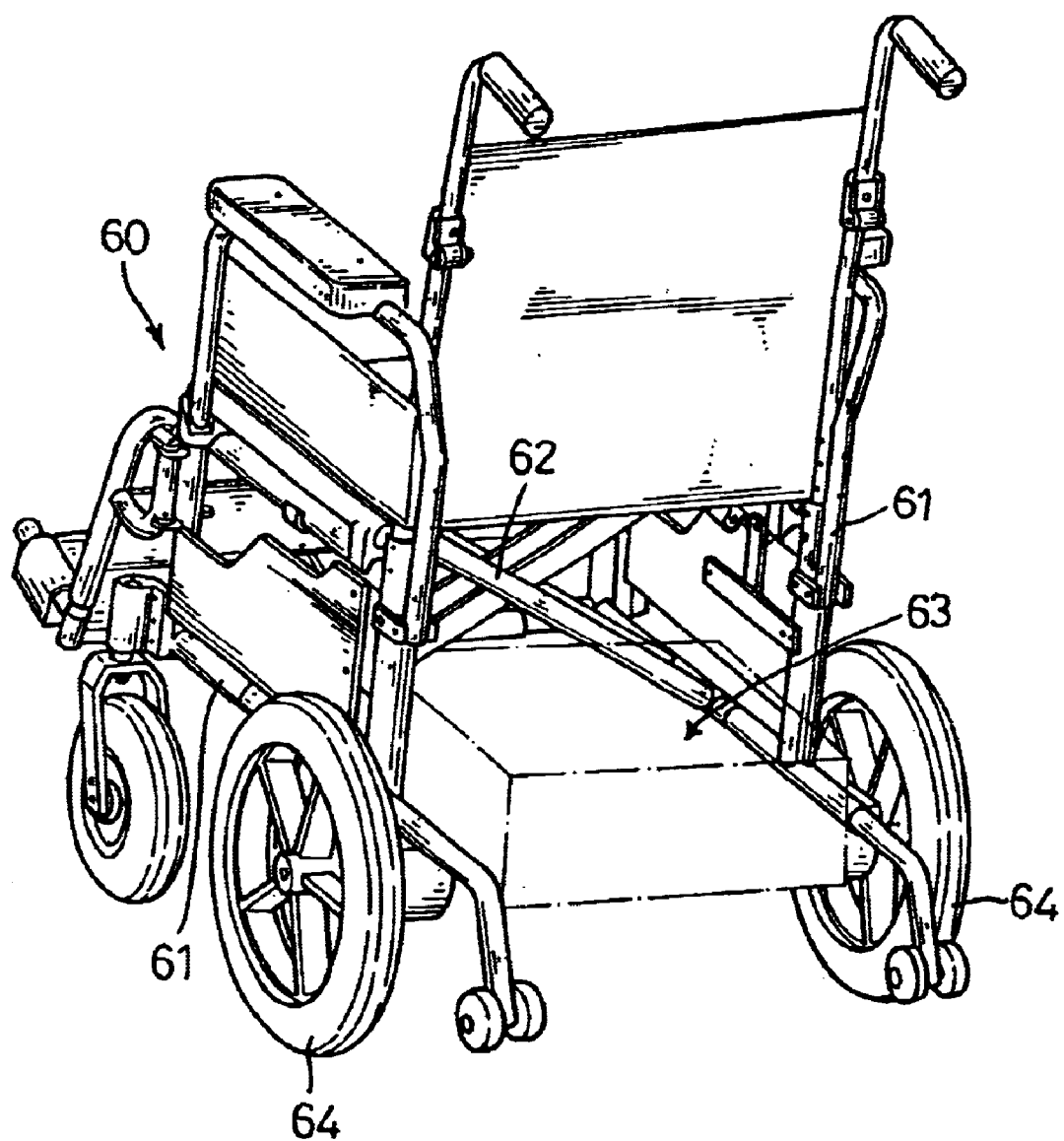
FIG. 4 is a perspective view of a motorized wheel chair with a conventional battery compartment.
Figure 5:
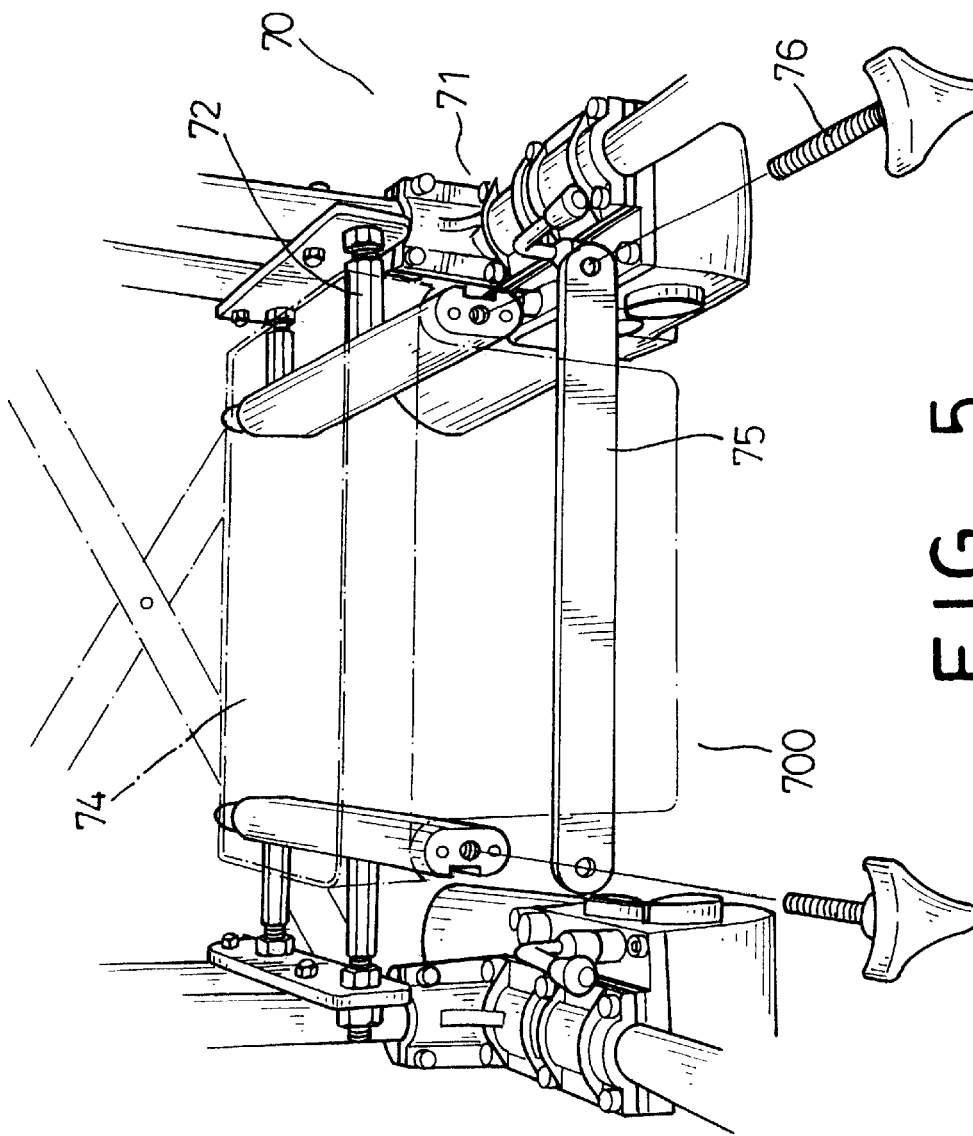
FIG. 5 is a partial perspective view showing a conventional battery compartment.
Figure 6:
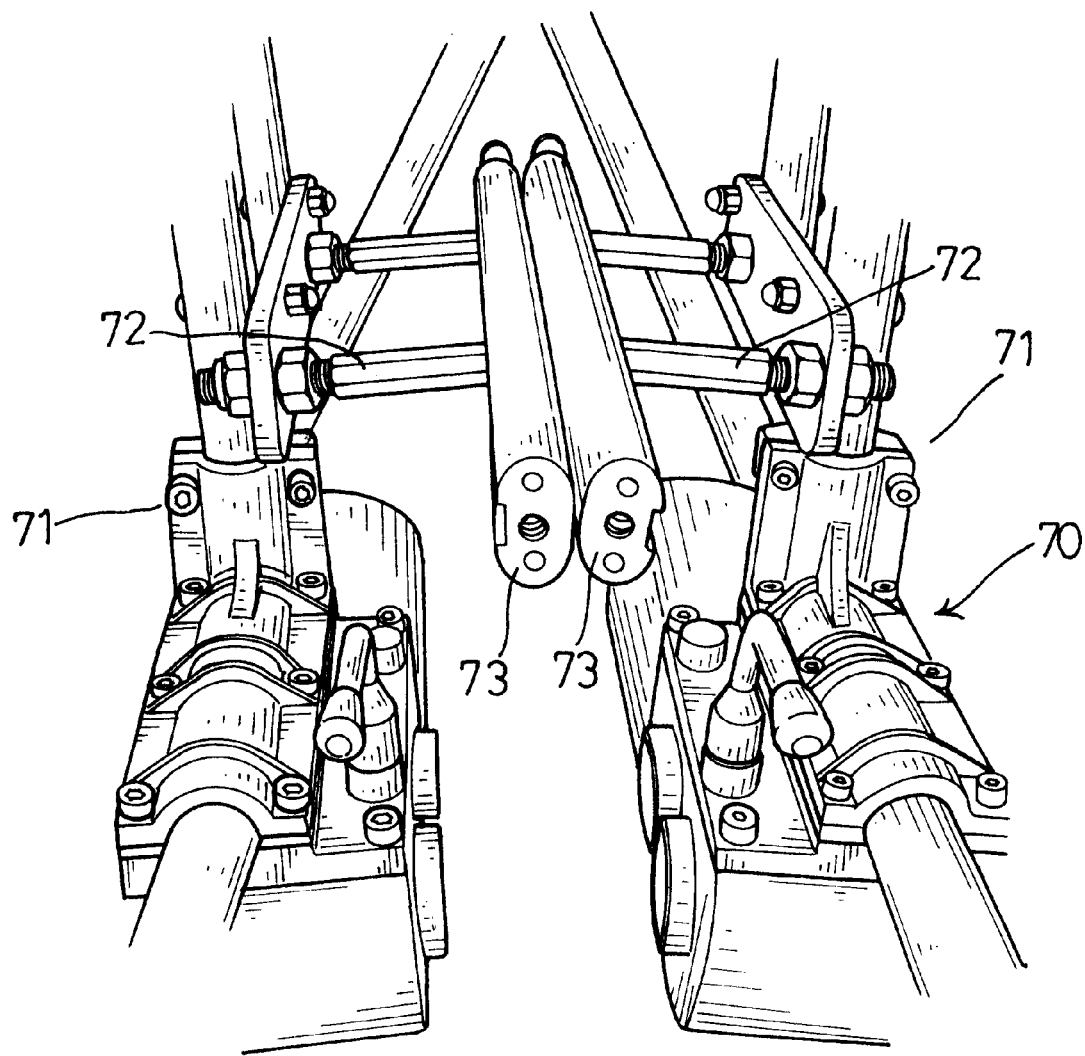
FIG. 6 is a perspective view showing that the conventional structure as shown in FIG. 5 for holding the battery is folded.

With reference to FIG. 3, when the motorized wheel chair is to be folded, unlike in the prior art, the user will not have to disassemble the battery compartment (20). The user only needs to remove the battery (not shown) for storage elsewhere and then brings together the first and second frames (22,23) so that the motorized wheel chair is able to be folded.

It is concluded that the battery compartment of the present invention requires no disassembly process for folding the motorized wheel chair so that there is no worry about losing parts. Moreover, the structure of the battery compartment is simple so that no major alteration is required and therefore, the cost is low.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. A battery compartment for a motorized wheel chair, the battery compartment comprising:

a first securing bracket adapted to be securely connected to a side bracket of the motorized wheel chair;

a second securing bracket adapted to be securely connected to the side bracket of the motorized wheel chair and being opposite to the first securing bracket;

a U shaped first fame pivotally connected to the first securing bracket; and a U shaped second frame pivotally connected to the second securing bracket and to the first frame;

wherein the first frame has two extensions extending out from an outer face of a bottom of the first frame to correspond to one of two sleeves formed on the first securing bracket; and wherein each extension has a through hole so that a securing bolt is able to extend into the aligned through hole and the sleeve to secure the pivotal engagement between the first securing bracket and the first frame.

2. The battery compartment as claimed in claim 1, wherein the second frame has two extensions extending out from an outer face of a bottom of the second frame to correspond to one of two sleeves formed on the second securing bracket, and wherein each extension of the second securing bracket has a through hole so that a securing bolt is able to extend into the aligned through hole and the sleeve to secure the pivotal engagement between the first securing bracket and the second frame.

3. The battery compartment as claimed in claim 2, wherein the first frame has two distal ends each having a second through hole defined to correspond to an aperture defined in each of two distal ends of the second frame so that a bolt and nut combination is able to secure the pivotal engagement between the first and second frames.

4. The battery compartment as claimed in claim 3, wherein the first frame has a stop formed adjacent to each of two distal ends of the first frame so as to prevent excessive pivotal movement of the second frame relative to the first frame.

5. The battery compartment as claimed in claim 2, wherein the first frame has a stop formed adjacent to each of two distal ends of the first frame so as to prevent excessive pivotal movement of the second frame relative to the first frame.

6. The battery compartment as claimed in claim 1, wherein the first frame has two distal ends each having a second through hole defined to correspond to an aperture defined in each of the two distal ends of the second frame so that a bolt and nut combination is able to secure the pivotal engagement between the first and second frames.

7. The battery compartment as claimed in claim 1, wherein the first frame has a stop formed adjacent to each of two distal ends of the first frame so as to prevent excessive pivotal movement of the second frame relative to the first frame.

* * * * *